MAGNETIC SWITCHING CIRCUIT

Filed June 13, 1958

Inventor
ROY E. TROELL
By [signature]
Attorney

United States Patent Office 2,987,626

Patented June 6, 1961

2,987,626
MAGNETIC SWITCHING CIRCUIT

Roy E. Troell, Ridgewood, N.J., assignor to International Telephone and Telegraph Corporation, Nutley, N.J., a corporation of Maryland Filed June 13, 1958, Ser. No. 741,783
2 Claims. (Cl. 307—88)

This invention refers to a magnetic switching circuit and more particularly to a magnetic switching circuit utilizing control windings thereon.

In video and pulse circuits it is often desirable to switch a video or pulse signal by means of a gate signal having the same frequency components. One desirable characteristic of such a switching circuit would be to have a minimum of gate signal appearing in the output. Another desirable characteristic would be to control as small a signal as possible.

In gating circuits such as television clamping circuits where diodes are generally used, the gating or clamping pulse comes through with the signal and thereby introduces false information into the output signal.

It is therefore an object of this invention to magnetically switch a desired signal with a minimum transmission of the gating signal.

A feature of this invention is the provision of a magnetic switching circuit for the transfer of pulse signals comprising a core of magnetically permeable material, a plurality of coils inductively coupled to the core, and means to apply the signals to a first one of said coils and thereby induce a voltage in a second one of the coils. Means are also provided to cause substantially a short circuit in the other coils wound on the same core thereby reflecting the short circuit into the first coil in order to inhibit inductance of the signals into the second coil during the short circuit.

Another feature is the provision of a magnetic switching circuit for transferring pulse signals and responsive to a control voltage which comprises a core of magnetic material, a plurality of coils inductively coupled to the core, means to apply these signals to a first one of these coils and thereby induce voltage in the second one of the coils. Gating means are provided to couple together the other coils of the plurality of coils and a control voltage is applied to the gating means to cause conduction and thus complete a low impedance circuit through the other coils, whereby a low impedance is reflected into the first coil in order to inhibit induction of the pulse signals into the second coil during the application of the control voltage.

A further feature of the magnetic switching circuit is third and fourth control coils on the core and gating means which include at least first and second diodes coupled back to back, wherein a control voltage is applied to the junction of the diodes. The third and fourth coils are conductively coupled at a common point to the first coil.

Figure 1:
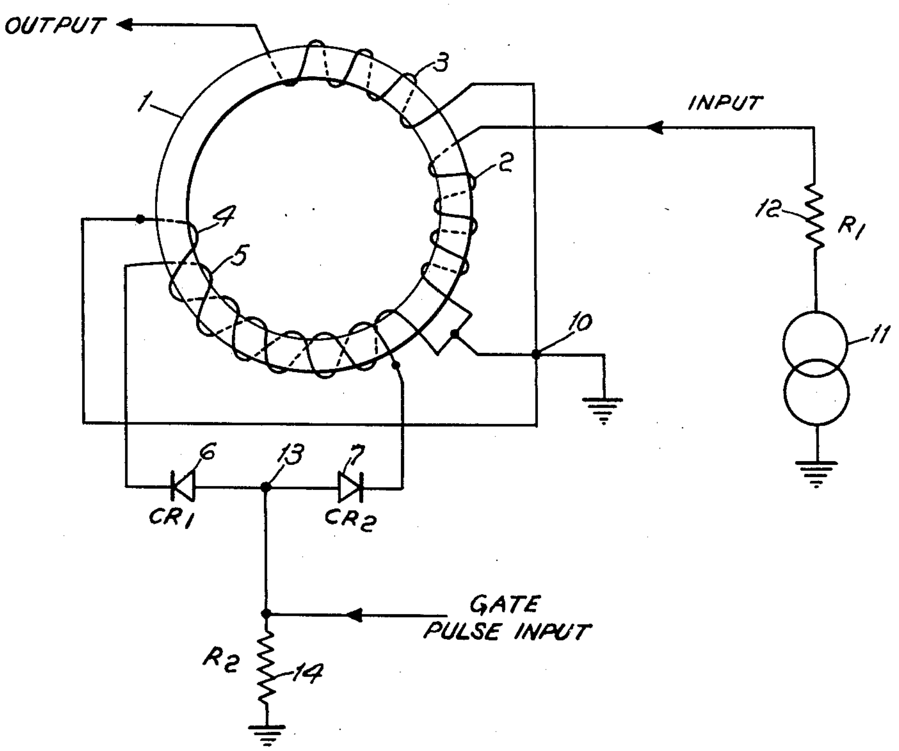
Figure 2:
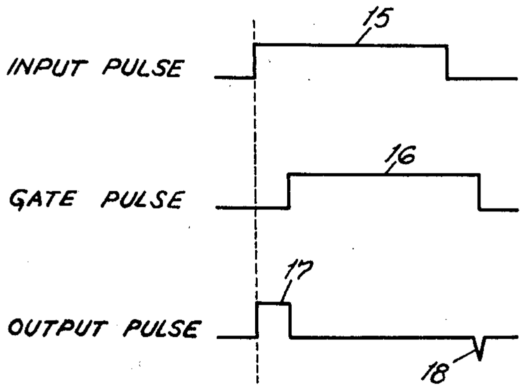

The foregoing and other objects and features of this invention and the manner of attaining them will become more apparent and the invention itself will be best understood by reference to the following description of an embodiment of the invention taken in conjunction with the accompanying drawings comprising FIGS. 1 and 2, wherein:

FIG. 1 is a schematic diagram of the magnetic switching circuit of this invention; and FIG. 2 is a graph of the waveforms illustrating the operation of this invention.

Referring now to FIG. 1, there is shown a core 1 of high permeability magnetic material for low leakage inductance on which is wound a primary coil 2. A secondary output coil 3 is wound adjacent to the coil 2 on the core. Two control windings 4 and 5 are bifilarly wound on the magnetic core 1 for minimum leakage inductance and are connected so that the net flux due to current flow is cancelled. The connection between the coils 4 and 5 is made by means of a pair of diodes 6 and 7 connected back to back. The other ends of the coils 4 and 5 are connected to a common ground point 10 to which is also connected the coils 2 and 3. A generator 11 is a source of signals which is fed into the input winding 2, and is connected to the input terminal of the input coil 2 by means of resistor 12. A gate control voltage is applied to the junction 13 of the diodes 6 and 7, which is kept above ground by the resistor 14.

The operation of the circuit is as follows: The diodes are normally cut off and are made to conduct by the application of the gate pulse. Without a gate pulse and the diode biased beyond cutoff, the pulse signal 15, as shown in FIG. 2, applied to the input of the coil 2 will appear at the output of coil 3 by normal transformer action. When it is desired to switch off or attenuate the signal, a gate pulse 16 is applied at the junction point 13 of the diodes. This will cause these diodes to conduct and effectively a closed circuit will be established between the control windings 4 and 5. The amplitude of the gate pulse 16 will determine the amount of conduction of the diodes and the amount of attenuation of the input pulse 15. The gating current which flows through the diodes flows in opposite directions through the two control windings 4 and 5 so that the net change in flux of the core is very small. Any output of coil 3 due to the gate pulse will be kept to a negligible value limited to leakage and different diode switching characteristics. By causing the diodes to conduct, this in effect creates a low impedance path which is substantially a short circuit in the windings 4 and 5. This equivalent short circuit is in turn reflected back into the input winding 2 according to the relation.

$$\frac{Z_s}{Z_p}=\frac{N_s^2}{N_p^2}$$

where $Z_p$ is the impedance of the primary winding 2, $Z_s$ is the impedance of the control windings 4 and 5, $N_s$ is the number of turns in the windings 4 and 5 and $N_p$ is the number of turns in the primary winding 2. It is apparent from this equation that as the impedance of the windings 4 and 5 approaches zero, then the impedance of the primary winding will also approach zero or an equivalent short circuit. This short circuit reflected back into the primary in effect prevents a rapid change of flux in the magnetic circuit and inhibits any induction into the output winding 3. The application of the gate pulse 16 during a portion of the time that the input pulse 15 is on will effectively cancel that portion of the input pulse when the two pulses are coincident and of the same amplitude and leave the output pulse in the form of the pulse 17. The pip 18 which occurs at the end of the gate pulse is due to the two paths through the diodes not being identical and the impossibility of balancing them out.

One application of this gate circuit is in the reduction of pulse length of video pulses. If a video pulse of any length is connected to the input winding 2 and a delayed pulse of equal length is connected to the gate circuit and causes the diode to conduct, the output pulse length from the winding 3 will never exceed the delay between the input pulse and the gate pulse.

In a reduction to practice of this circuit, the following parameters or the circuit elements were used:

Frequency—100 kc./s. to 10 mc./s.
Core—Permalloy 0.001" thick, ⅞" O.D., ½" I.D. and 5/16" wide, Arnold Engineering Company, Marengo, Illinois
Windings 2, 3, 4, 5—22 turns, #26 enamelled wire
CR1, CR2—Crystal diodes 1N100
$R_1$—Resistor—470 ohms ½ watt
$R_2$—Resistor—100 ohms ½ watt While I have described above the principles of my invention in connection with specific apparatus, it is to be clearly understood that this description is made only by way of example and not as a limitation to the scope of my invention as set forth in the objects thereof and in the accompanying claims.

I claim:

1. A magnetic switching circuit for the transfer of pulse signals and responsive to a control voltage comprising a core of magnetically permeable material and having a single closed flux loop path, first, second, third and fourth coils inductively coupled to said core, said third and fourth coils being bifilarly wound on said coil for cancellation of any magnetic flux due to current flow in said third and fourth coils, a source of said signals coupled to said first coil to induce an output voltage in said second coil, at least one pair of diodes in back to back coupled relation connecting said third and forth coils, means coupling said third and fourth coils to a common junction with said first coil, means to apply a control voltage to the junction of said diodes to cause said diodes to conduct and complete a low impedance circuit through said third and fourth coils, whereby said low impedance is reflected into said first coil to inhibit induction of said signals nto said second coil during the application of said control voltage.

2. A magnetic switching circuit for the transfer of pulse signals and responsive to a control voltage comprising a core of magnetically permeable material and having a single closed flux loop path, a plurality of coils inductively coupled to said core, means to apply said signals to a first one of said coils and thereby induce a voltage in a second one of said coils, gating means coupling together third and fourth coils of said plurality of coils, said gating means including at least first and second diodes coupled back to back, means to apply a control voltage to the junction of said diodes to complete a low impedance circuit through said third and fourth coils and thereby reflect said low impedance into said first coil and inhibit induction of said signals into said second coil during the application of said control voltage.

References Cited in the file of this patent

UNITED STATES PATENTS

| | | |
|---|---|---|
| 1,485,361 | Bauch | Mar. 4, 1924 |
| 1,811,941 | Keith | June 30, 1931 |
| 1,871,697 | James | Aug. 16, 1932 |
| 2,686,291 | Macklem | Aug. 10, 1954 |
| 2,686,292 | Macklem | Aug. 10, 1954 |
| 2,767,364 | Guggi | Oct. 16, 1956 |
| 2,886,788 | Cushman et al. | May 12, 1959 |